United States Patent [19]
Woods

[11] Patent Number: 6,061,201
[45] Date of Patent: May 9, 2000

[54] METHOD OF MEASURING THE READ-TO-WRITE OFFSET IN A DISC DRIVE HAVING SEPARATE READ AND WRITE ELEMENTS

[75] Inventor: Philip R. Woods, Oklahoma City, Okla.

[73] Assignee: Seagate Technology, Inc., Shakopee, Minn.

[21] Appl. No.: 08/192,638

[22] Filed: Feb. 7, 1994

[51] Int. Cl.[7] .................................................. G11B 5/596
[52] U.S. Cl. ........................................... 360/77.06; 360/76
[58] Field of Search ........................... 360/76, 66, 77.04, 360/77.06, 77.02

[56] References Cited

U.S. PATENT DOCUMENTS

| | | | |
|---|---|---|---|
| 4,485,418 | 11/1984 | Bremmer | 360/77.06 |
| 4,620,244 | 10/1986 | Krause | 360/77.02 |
| 4,644,421 | 2/1987 | Miwa et al. | 360/75 X |
| 4,816,938 | 3/1989 | Cowen et al. | 360/75 |
| 4,969,059 | 11/1990 | Volz et al. | 360/77.04 X |
| 5,001,579 | 3/1991 | Compton | 360/77.08 |
| 5,185,681 | 2/1993 | Volz et al. | 360/77.05 |
| 5,233,487 | 8/1993 | Christensen et al. | 360/77.04 |

FOREIGN PATENT DOCUMENTS

| | | | |
|---|---|---|---|
| 2079666 | 4/1993 | Canada | 360/77.04 |

*Primary Examiner*—Andrew L. Sniezek
*Attorney, Agent, or Firm*—Kinney & Lange, PA

[57] ABSTRACT

A method of measuring the read-to-write offset of a track in a disc drive system having separate read and write elements measures the amplitude of a test signal across the width if a track. A test pattern is written to the track at a predetermined actuator offset, which will typically be zero. Next, the read element is incrementally moved across the width of the track to measure a maximum amplitude in the read signal from the read element. After the maximum amplitude has been determined, the read element is incrementally moved across the width of the track to find first and second actuator offset positions where the read signal has an amplitude approximately equal to a predetermined percentage of the maximum amplitude. A midpoint is calculated between the first and second actuator offset positions, and the read-to-write offset is equal to the difference between the midpoint and the predetermined actuator offset.

15 Claims, 14 Drawing Sheets

METHOD OF MEASURING THE READ-TO-WRITE OFFSET IN A DISC DRIVE HAVING SEPARATE READ AND WRITE ELEMENTS

BACKGROUND OF THE INVENTION

The present invention is a method of measuring the read-to-write offset in a disc drive system having separate read and write elements. More specifically, the present invention is a method of measuring the read-to-write offset by incrementally measuring the amplitude of a test pattern across the width of a track.

In the prior art, a disc drive head was typically comprised of a single thin film transducer, which performed both read and write functions. As the state of disc drive design evolved, track widths became narrower. It has became increasingly difficult to combine the read and write functions in a single thin film transducer. Accordingly, disc drive designers began to use separate read and write elements. Typically, the write element was comprised of a thin film transducer optimized to perform the write function. The read element typically comprised a magnetoresistive (MR) sensor. The MR sensor was formed from a strip of magnetoresistive material, typically Permalloy, which had a resistance which varied with the magnitude of flux passing through the sensor. The MR sensor was optimized to perform read functions, and was usually narrower than the write element.

Because the read and write elements cannot occupy the same physical space, a gap exists between the two elements. In a disc drive having a linear actuator, the effect of the gap can be minimized because the two elements can be placed in-line, and will remain in-line for every track on the disc surface. However, linear actuators are rarely used in modern disc drives because they are slower, require more space, and are not as precise as rotary actuators.

Most newer disc drives employ a rotary actuator. A rotary actuator includes an arm which is rotatably mounted to traverse an arc across the disc surface. Because the arm traverses an arc, the gap between the read and write elements results in a read-to-write offset. While the read and write elements might in-line for a single track, they typically will not be in-line for other tracks on the disc surface.

Accordingly, it is desirable to have a method for measuring and managing the read-to-write offsets for every track on disc drive surface and every pair of read and write elements in a disc drive system.

SUMMARY OF THE INVENTION

The present invention is method for measuring the read-to-write offset of a track on a disc drive system having a transducer with separate read and write elements. First, a test pattern is written to the track at a predetermined actuator offset, which will typically be zero. Next, the read element is incrementally moved across the width of the track to measure a maximum amplitude in the read signal from the read element. After the maximum amplitude has been determined, the read element is incrementally moved across the width of the track to find first and second actuator offset positions where the read signal has an amplitude approximately equal to a predetermined percentage of the maximum amplitude. A midpoint is calculated between the first and second actuator offset positions, and the read-to-write offset is equal to the difference between the midpoint and the predetermined actuator offset.

DETAILED DESCRIPTION OF THE PREFERRED EMBODIMENTS

Figure 1:
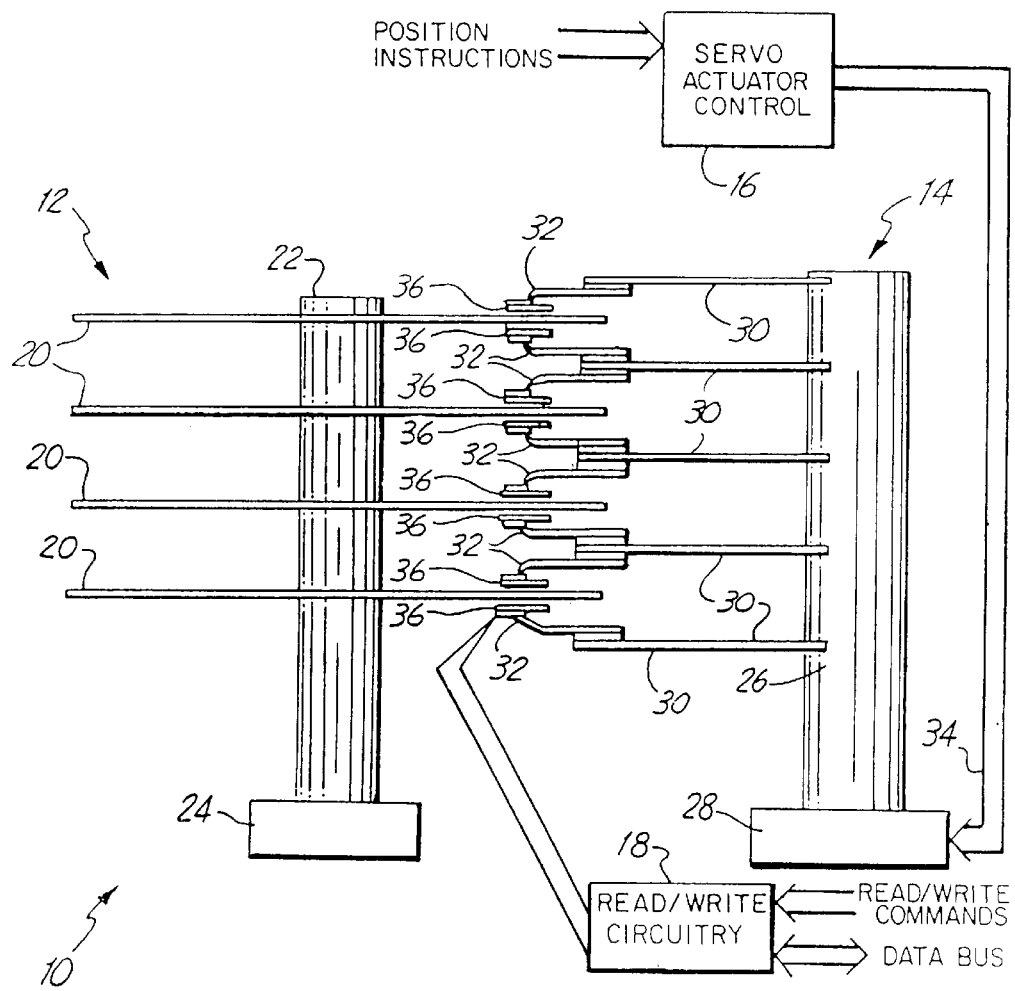
FIG. 1 is a view of a disc drive system having a rotary actuator.

FIG. 1 shows disc drive system 10, which is comprised of disc pack 12, actuator 14, servo actuator control 16, and read/write circuitry 18. Disc pack 12 is comprised of discs 20, spindle 22, and spindle motor 24. Each disc 20 is mounted to spindle 22. Spindle 22 is rotated by spindle motor 24. Actuator 14 is comprised of E-block 26, actuator motor 28, support arms 30, flexure arms 32, and sliders 36. E-block 26 is rotatably mounted to move support arms 30. Each support arm 30 is attached to either one or two flexure arms 32, and each flexure arm 32 is attached to a slider 36. The sliders 36 fly adjacent surfaces of the discs 20, with each slider 36 carrying a transducer which is comprised of separate read and write elements.

The read and write elements carried by each slider 36 are electrically coupled to read/write circuitry 18. Read/write circuitry 18 includes circuitry for producing a write signal to drive the write elements, amplifying circuitry for producing a read signal from the read elements, and error detection means for detecting read errors.

Servo actuator control 16 is coupled to actuator motor 28 by actuator bus 34. In this embodiment, actuator 28 is depicted as a motor mounted coaxially with spindle 14. However, in other embodiments actuator motor 28 comprises a voice-coil motor, as is known in the art. In other embodiments servo actuator control 16 is comprised of a plurality of microcontrollers.

Figure 2:
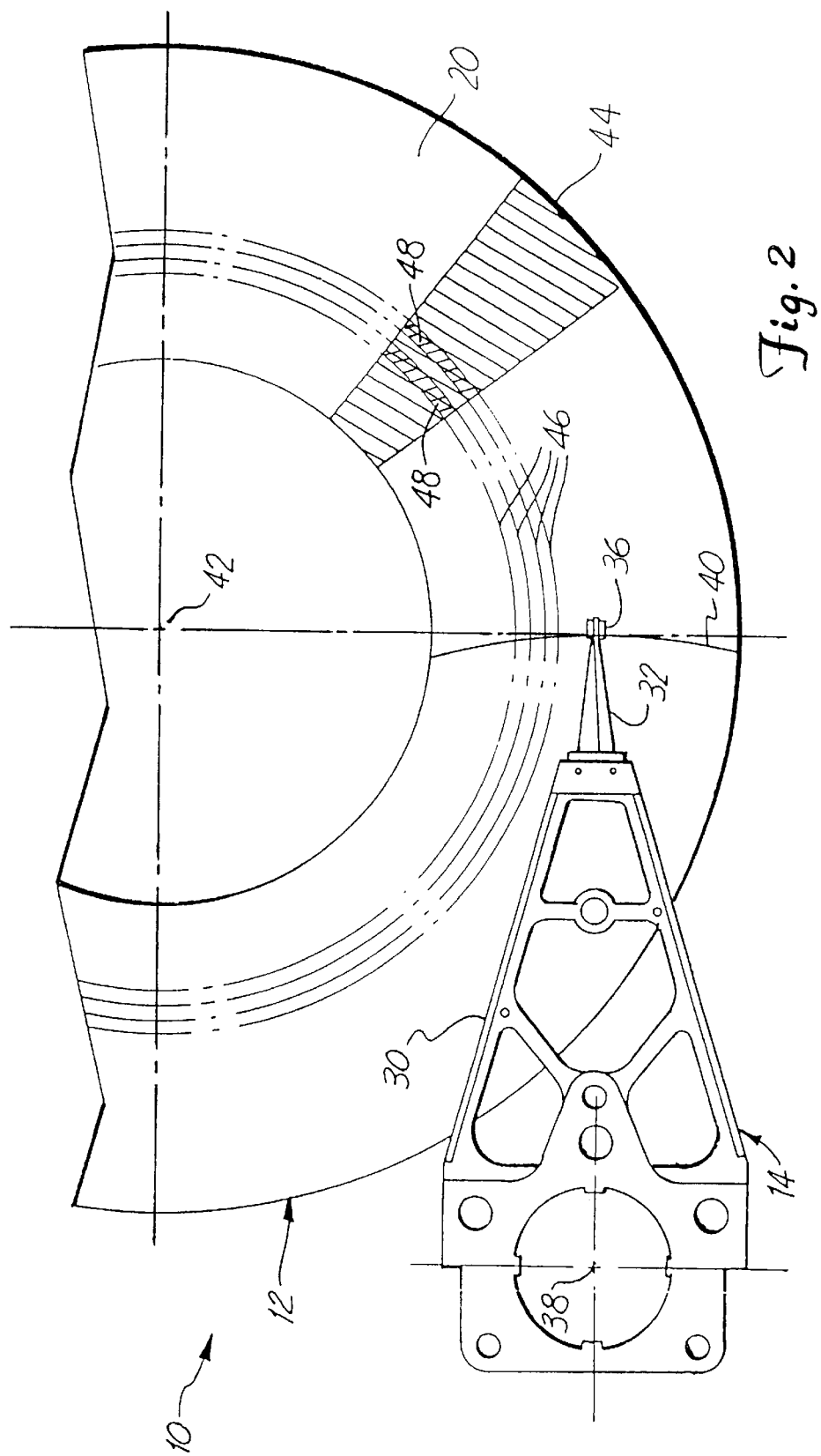
FIG. 2 is a top view of a disc and actuator.

FIG. 2 is a top view of a disc 20 and actuator 14. In FIG. 2, actuator 14 rotates about axis of rotation 38. As actuator 14 rotates, support arm 30 and flexure arm 32 move slider 36 along arc 40.

Disc 20 of disc pack 12 rotates around axis of rotation 42. Disc 20 is angularly divided into a series of sections 44, and radially divided into a series of tracks 46. The intersection of each track 46 with each section 44 forms a sector 48. Sectors 48 are the smallest data storage unit available on the disc.

As disc 20 rotates about axis of rotation 42, sectors pass adjacent slider 36. The intersection of slider 36 and a track 46 forms a skew angle. Because there is a gap between the read and write elements and slider 36, this skew angle gives rise to a read-to-write offset.

Figure 3:
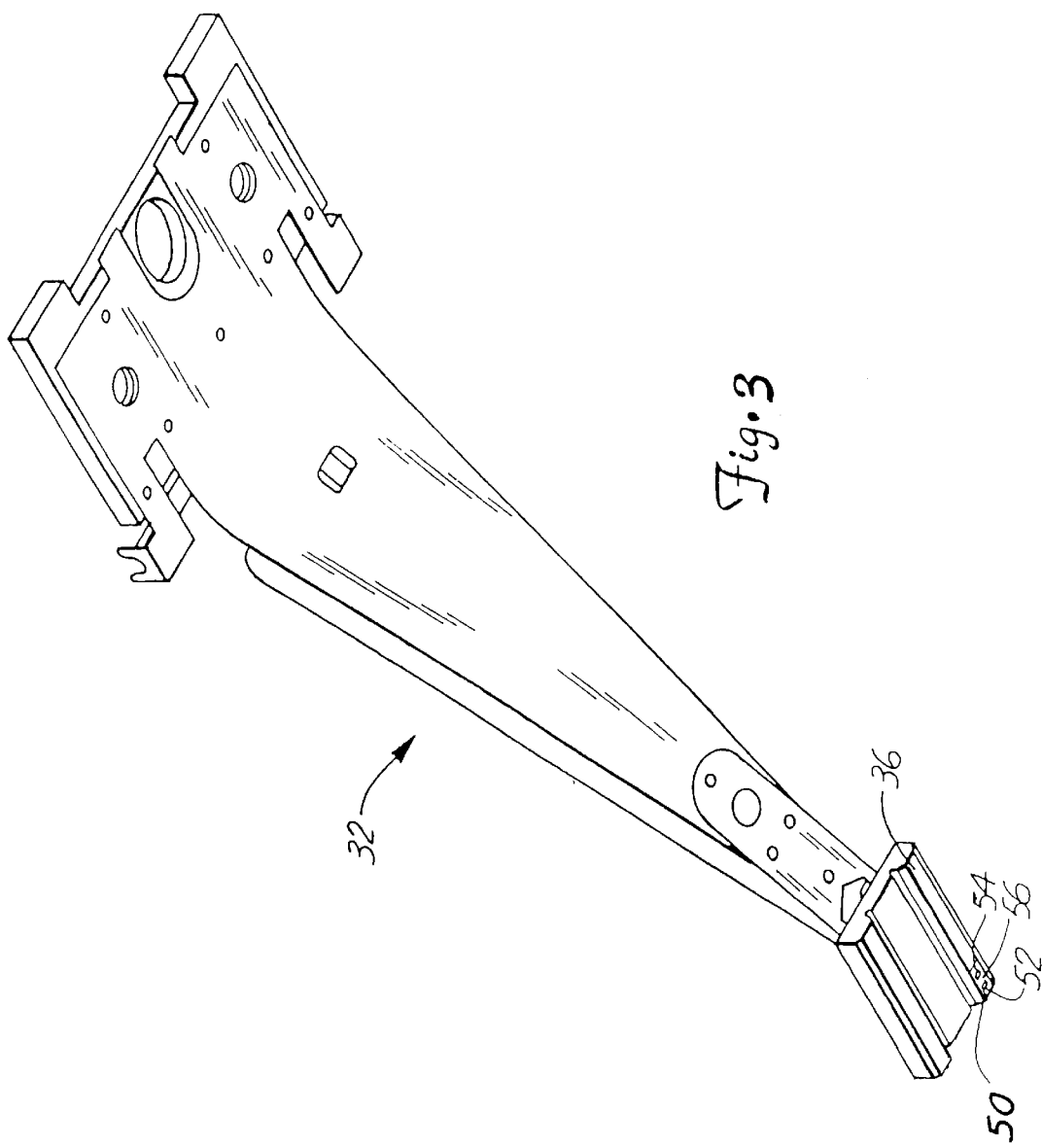
FIG. 3 is a view of a flexure arm shown in FIG. 2, along with a slider which carries a transducer having separate read and write elements.

FIG. 3 is a view of flexure arm 32 and slider 36 of FIG. 2 as viewed from the perspective of disc surface 20. Slider 36 carries transducer 50. Transducer 50 is comprised of write element 52 and read element 54. A gap 56 separates write element 52 from read element 54.

Figure 4:
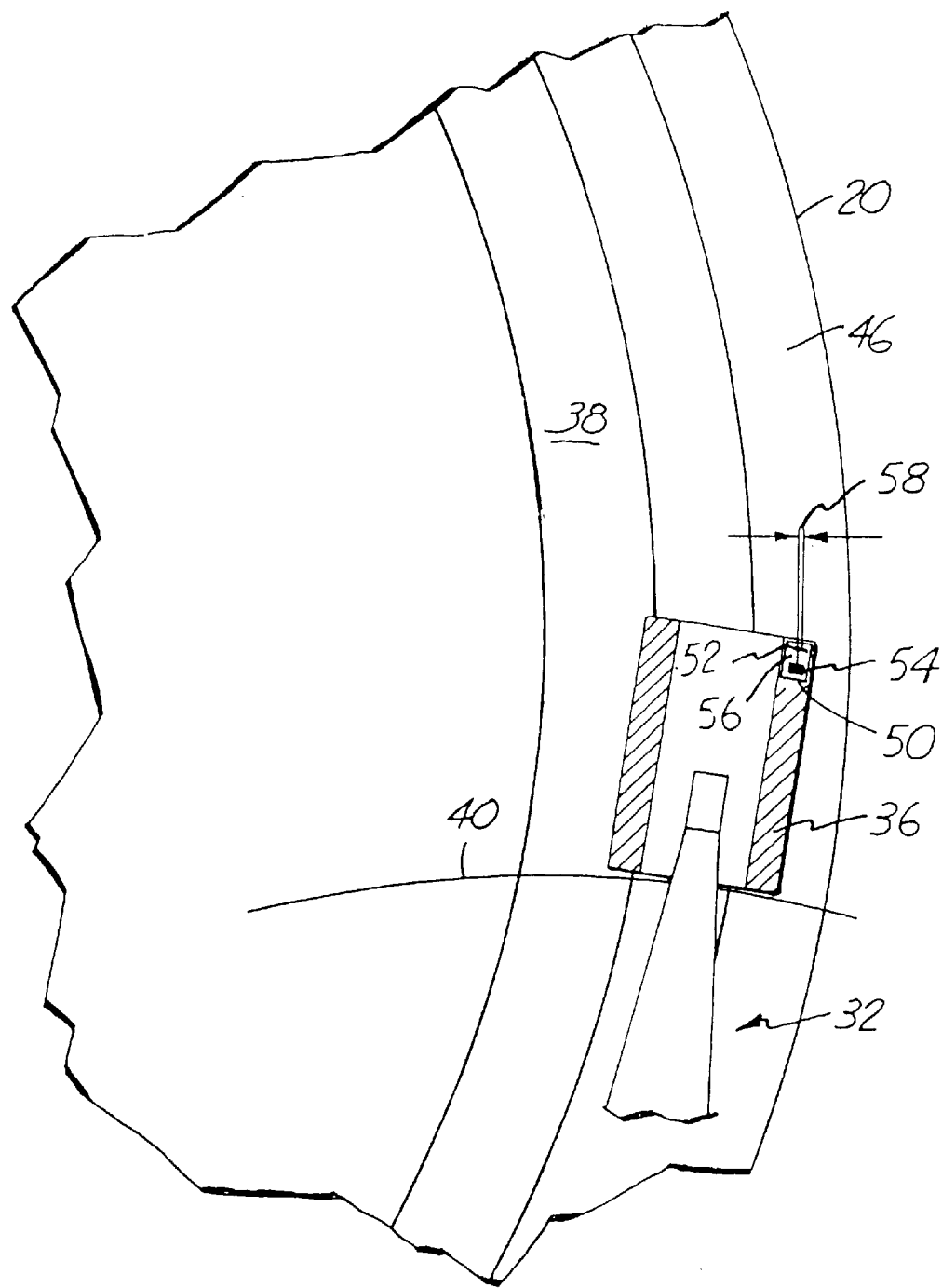
FIG. 4 is an expanded view of the slider of FIG. 3 adjacent an outer track of the disc of FIG. 2.

FIG. 4 is an enlarged view of slider 36 and disc 20 in FIG. 2, with slider 36 positioned adjacent an outer track 46. Accordingly, flexure arm 32 is positioned at an end of arc 40, resulting in a substantial skew angle between slider 36 and track 46. Because of gap 56 between write element 54 and read element 50, a substantial read-to-write offset 58 is present at this track.

Figure 5:
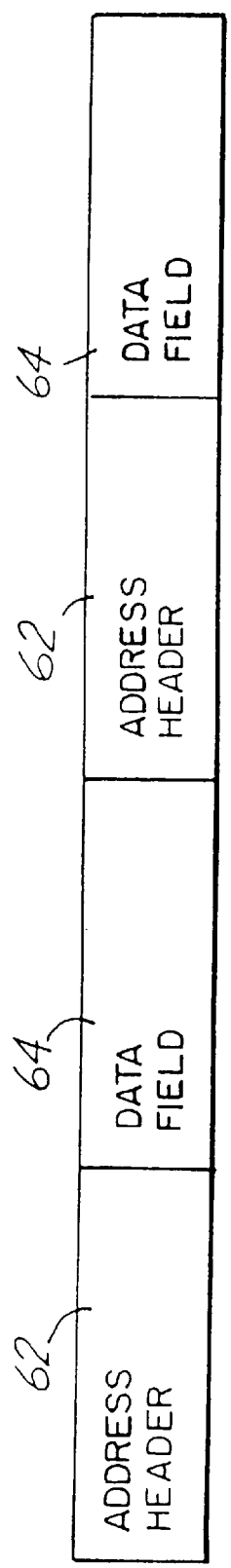
FIGS. 5 and 6 show prior art data storage formats.

FIG. 5 is a diagram showing prior art data storage format 60. Format 60 is comprised of an alternating sequence of address headers 62 and data fields 64. Address headers 62 store address information which identifies the respective addresses of the data fields. Data fields 64 store user data.

In a disc drive using prior art read/write thin film transducer heads, the head is positioned directly adjacent a track containing format 60. During a write operation, an address field 62 is read and compared to a target address. If the address read from an address header 62 matches the target address, the data field 64 passing adjacent the thin film transducer immediately after is written with the target data. During a read operation, an address header 62 is read and compared to a target address. If the address read from the address header 62 matches the target address, the next data field 64 is read and the data is provided to the host computer system.

In a disc drive system having a transducer with a gap 56 between write element 52 and read element 54, write operations are significantly more complex. Read element 54 of transducer 50 must be positioned adjacent format 60 to read address headers 62. As soon as a target data field has been identified, actuator 14 must perform a minijog to position write element 52 adjacent data field 60, so that write element 52 can write data into the target data field 64. However, performing such a minijog between reading address header 62 and writing data field 64 is not practical in a modern high performance disc drive system.

Figure 6:
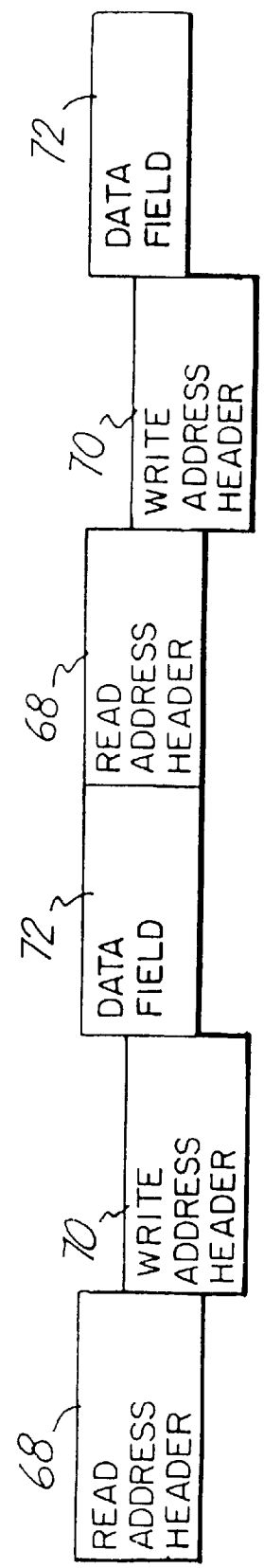

FIG. 6 shows a data storage format 66 in accordance with U.S. Pat. No. 5,257,149 to Forest C. Meyer and entitled disc drive with offset address field, which is assigned to the same assignee as the present application. This format was designed specifically for data storage systems having a gap between read and write elements.

Data format 66 is comprised of a successive series of read address headers 68, write address headers 70, and data fields 72. During a read operation, read element 54 is positioned adjacent read address headers 68. If an address read from a read address header 68 matches the target address, the data stored in the next data field 72 is read by read element 54 and provided to the host computer system.

During a write operation, read element 54 is positioned adjacent write address headers 70. Write address headers 70 are offset from read address headers 68 and data fields 72 by an offset magnitude based on skew angle and the gap 56 between the read element 54 and write element 52. During a write operation, read element 54 reads write address headers 70. If an address read from a write address header 70 matches a target address, the next data field 72 is written with the target data. Since the data fields 72 are offset from the write address header 70 by the same magnitude as the read-to-write offset of this track, write element 52 will already be positioned adjacent the data field 72.

Compared to prior art format 60 of FIG. 5, format 66 is faster because a minijog is not required after reading an address header and before writing data into a data field. In a high-speed disc drive formatted according to format 60, it is not practical to perform the minijog between the reading of the address header 62 and the writing of the next data field 72.

Regardless of whether a disc drive is formatted according to format 60 or 66, the disc drive system must be able to perform a minijog equal to the read-to-write offset 58 found at any given track. Using format 60, the minijog must be performed at a critical moment during a write operation. Using format 66, the minijog need not be performed at such a critical time but must still be performed when switching between read and write operations.

Figure 7:
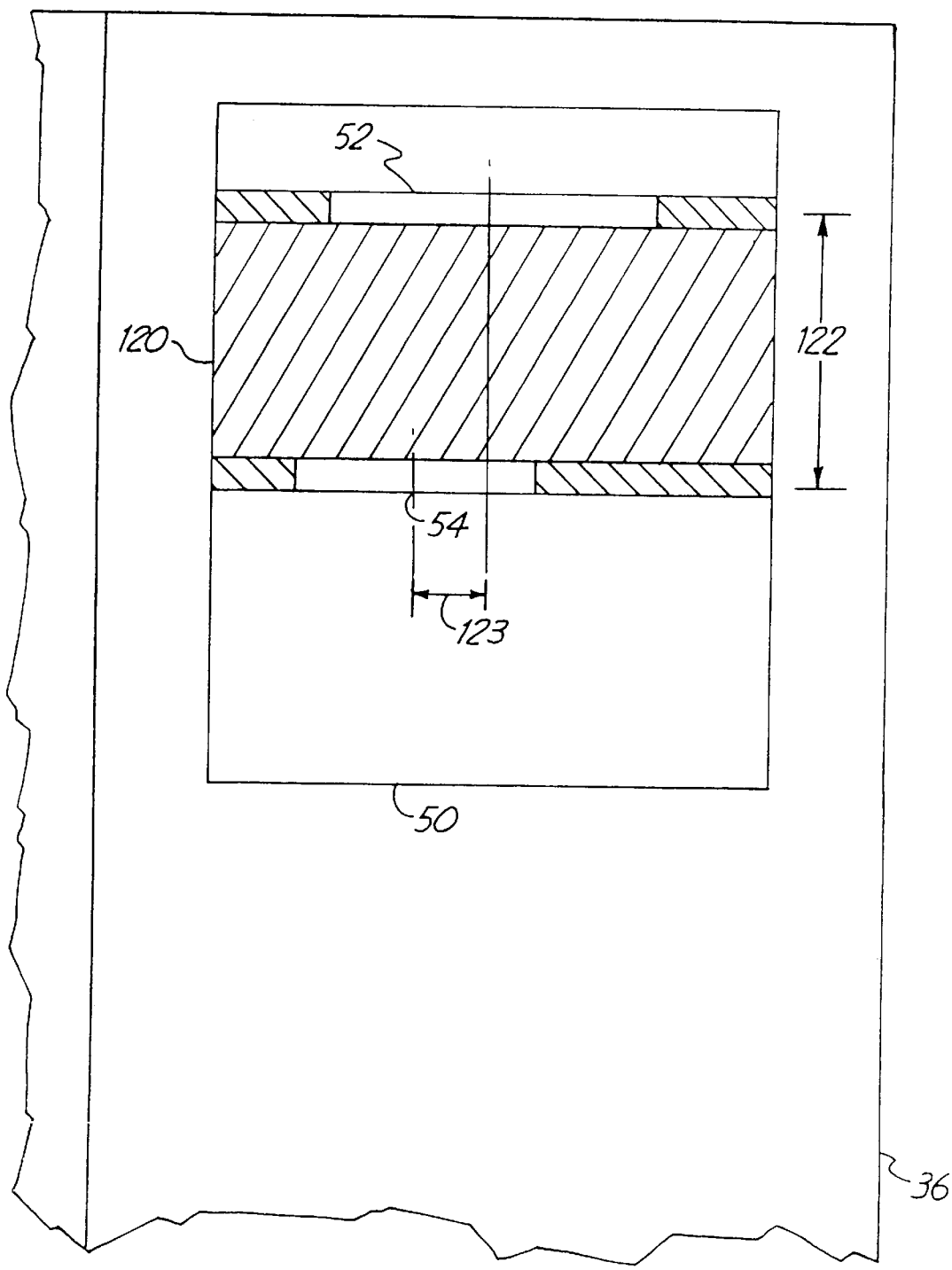
FIG. 7 is an expanded view of the transducer shown in FIG. 4.

FIG. 7 is an enlarged view of transducer 50, which is carried by slider 36 of FIGS. 3 and 4. FIG. 7 depicts a typical transducer construction. Transducer 50 is assembled by laminating together various layers. In FIG. 7, write element 52 is separated from read element 54 by spacing layer 120. In a typical transducer, there are many other layers present and layer 120 may be comprised of several layers of different material. The purpose of showing layer 120 is to illustrate that the gap 122 between elements 52 and 54 is a relatively constant because it is determined by the thicknesses of the intervening layers. However, the gap 123 between the centers of elements 52 and 54 is quite variable because it is determined by the positioning of the layers during the manufacturing process. Gap 23 can vary from transducer to transducer on the order of 100 microinches. Accordingly, it is essential that a disc drive must be provided with means for compensating for the read-to-write offset of every transducer, and at every track.

Because gap 122 is relatively fixed, gap 123 is variable, and the arc 40 traversed by slider 36 is relatively small, gap 123 can be viewed as being correctable by simply moving the actuator by an offset equal to 123. Since the geometry of similar disc drives is similar, a straight line with a known slope is a suitable approximation of an actual plot of the read-to-write offset for a given transducer versus track position. The slope of the line will be relatively constant from transducer to transducer and drive to drive. However, the Y intercept of the line will vary from transducer to transducer based on the magnitude of the gap 123 in FIG. 7.

Figure 8:
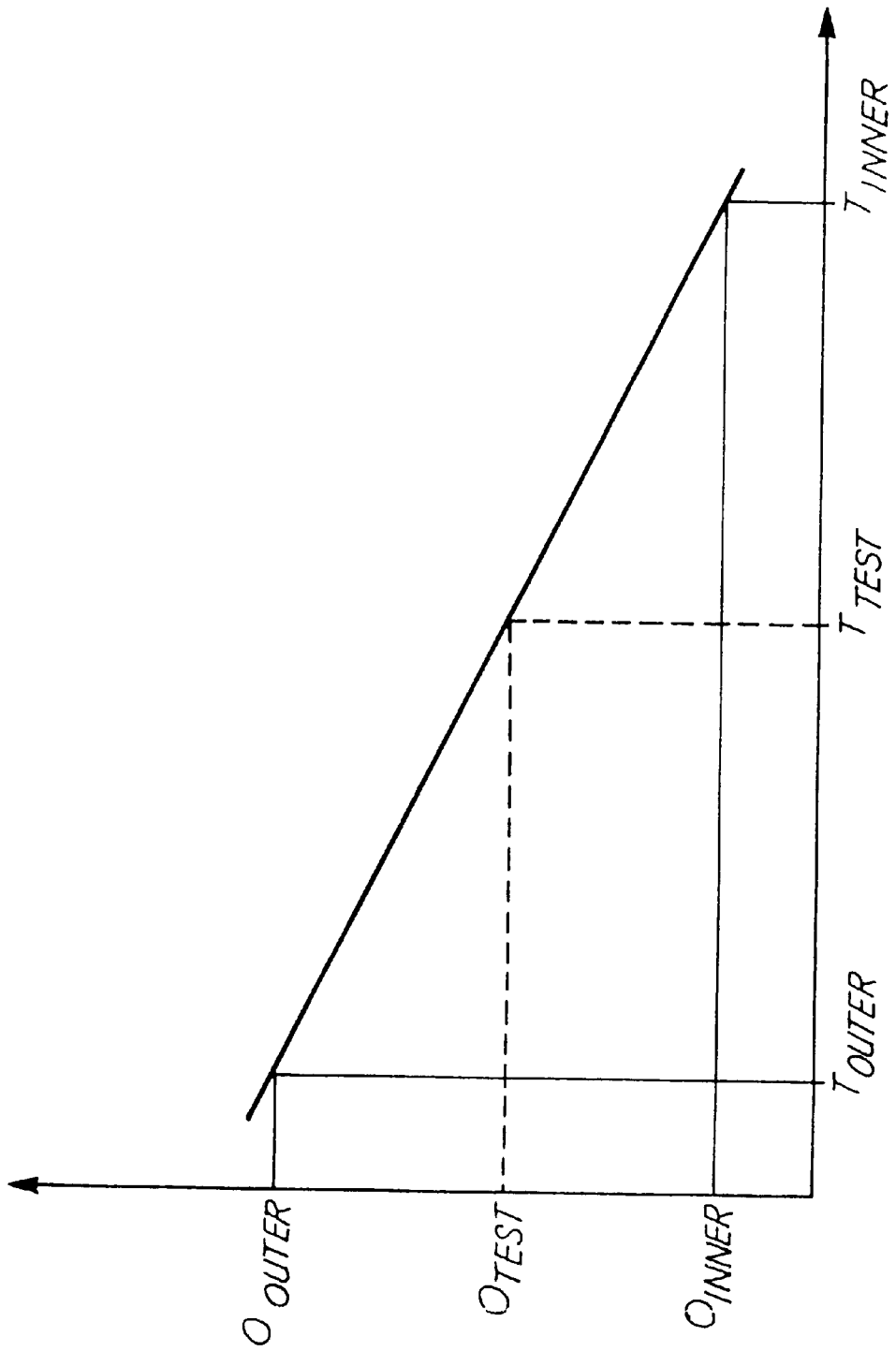
FIG. 8 is a graph showing the read-to-write offset versus radial track position for a typical disc drive transducer.

FIG. 8 is a graph showing the straight line approximation of read-to-write offset versus radial track position. As previously mentioned, the slope of this line will remain relatively constant from transducer to transducer and from drive to drive. However, the Y intercept will change. Accordingly, a profile of the read-to-write offset for every track on a disc surface can be determined by measuring the read-to-write offset for a single track on the disc surface. Once a single track is measured, the read-to-write offset of all tracks can be determined by using the slope shown in FIG. 8. Because the curve shown in FIG. 8 will, to some extent, be an approximation, it is desirable to measure the read-to-write offset at a track near the center of the disc. By measuring a track near the center, the accumulated error will be less as the actuator is moved toward the inner and outer tracks than if the measurement is made at an inner or outer track.

If, however, the curve shown in FIG. 8 should prove to be too simple of an approximation, additional tracks can be measured and the read-to-write offsets measured at these tracks can be applied to an appropriate predetermined curve. At worst, the offset can be measured for every track and every transducer in a disc drive, but this will produce a large amount of data which must be stored by the disc drive.

After the read-to-write offset has been determined, it is stored in a disc drive configuration profile, typically EPROM, ROM, or the servo disc, which is read into a memory table when the drive is powered up. Accordingly, when the drive must access a particular track using a particular transducer, the offset will be calculated.

Figure 9:
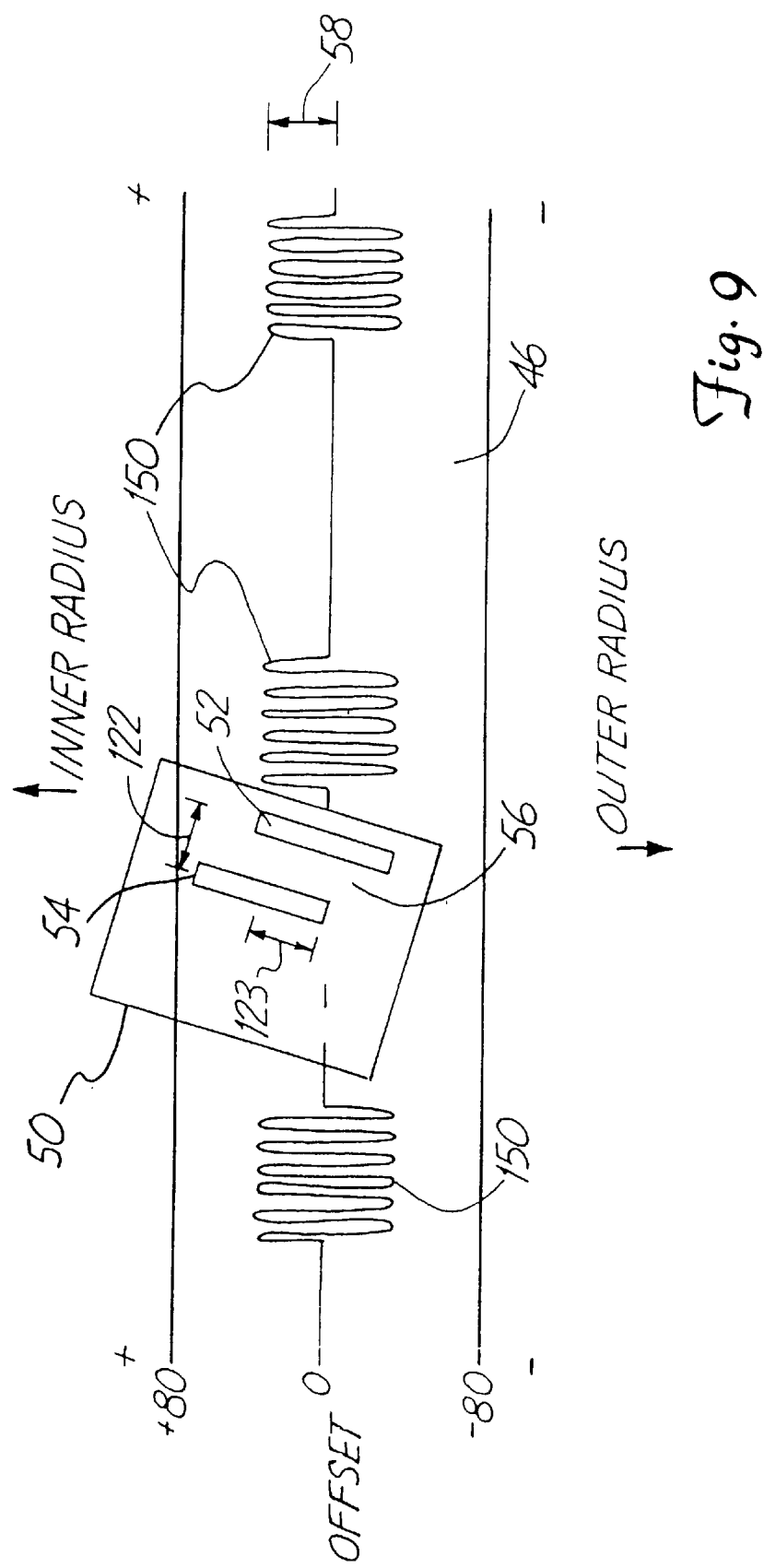
FIG. 9 is an expanded view of the transducer and outer track shown in FIG. 4.

FIG. 9 is an enlarged view of the outer track 46 and transducer 50 shown in FIG. 4. In this figure, a signal 150 has been recorded on track 46 by write element 52 at an actuator offset of 0. In addition, transducer 50 is shown in FIG. 8 positioned adjacent track 46 at an actuator offset of 0. At this actuator position, the signal 150 passes directly adjacent the center of write element 52. However, the center of read element 54 is not positioned directly adjacent signal 150, resulting in a read-to-write offset 58 at this particular track. As previously discussed, the read-to-write offset 58 is caused by the gap 56 separating write element 52 from read element 54 and the skew angle 40 between slider 36 and track 46.

In FIG. 9, when the center of write element 52 is positioned directly adjacent signal 150, the center of read element 54 is positioned at an actuator offset of approximately +35 from the center of the track. Accordingly, to position the center of read element 54 directly adjacent signal 150, actuator 14 must be offset −35 increments from the track center.

Figure 10:
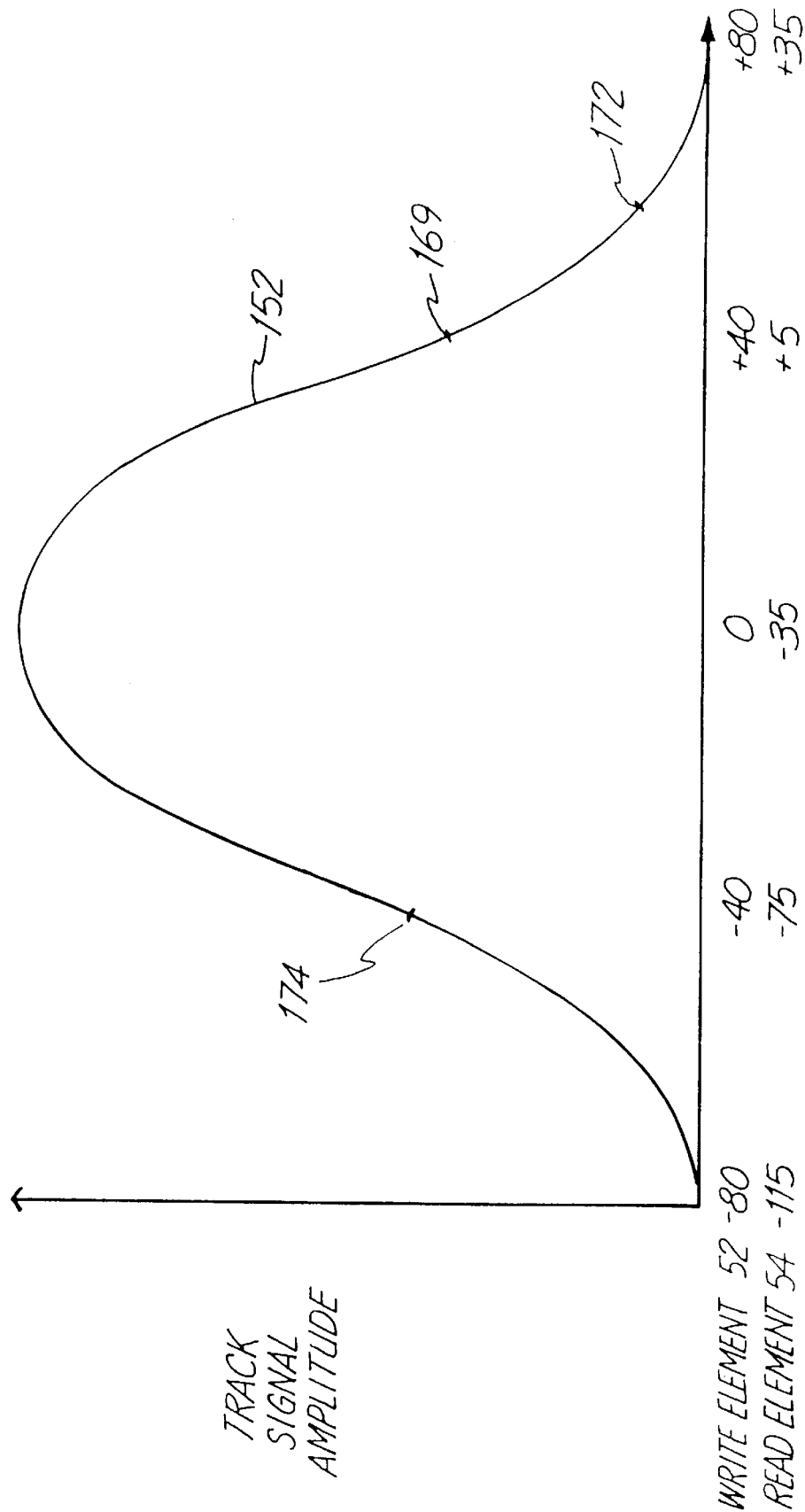
FIG. 10 is a graph showing track signal amplitude versus actuator offset of read and write elements.

FIG. 10 is a graph of curve 152. Curve 152 shows the amplitude of signal 150 of FIG. 9 plotted against actuator offset for write element 52 and read element 54. Signal 150 of FIG. 9 was written at an actuator offset 0. Therefore, by definition (neglecting actuator tolerances), curve 152 has a peak amplitude with respect to write element 52 at an actuator offset of 0. With respect to read element of 54, a read signal having a peak amplitude will be detected when read element 54 is positioned at an offset of −35.

As previously discussed, in the preferred embodiment the read-to-write offset will be taken at a track near the center of the disc. However, FIGS. 9 and 10 illustrate the actuator offset at an outer track to better illustrate that the actuator offset is caused by the gap 56 and the skew angle 40. Of course, when measuring a track near the center, the effect of the skew angle will be much less. However, the skew angle will be accounted for when the read-to-write offset is calculated for other tracks as shown in FIG. 8.

Many modern disc drives are provided with circuitry which allows a processor in the disc drive to determine whether the position of a track has shifted due to thermal contraction or expansion. In one type of thermal compensation scheme, a read element is incrementally moved across the width of a track to measure the amplitude across the track. Accordingly, a disc drive having this type of thermal compensation scheme is capable of reading a curve such as that shown in FIG. 10.

The present invention provides a method of measuring a read-to-write offset of a two element transducer at a given track of a disc surface. It is contemplated that the present invention can be implemented without additional hardware on disc drives employing the thermal compensation scheme described above. In other words, the present invention can be implemented in such disc drives by software changes. Of course, the method of the present invention can also be implemented on other types of disc drives by adding additional hardware and software.

FIGS. 11A–11E show a flow chart 154 which illustrates the method of the present invention. The flow chart uses several variables which change during the execution of the method. These variables, and their respective functions, are as follows:

$OMEAS$ = Old measurement of the amplitude of the read signal.

$NMEAS$ = New measurement of the amplitude of the read signal.

$MAX$ = Maximum measured amplitude of the read signal.

$TOP$ = Actuator offset at which MAX is measured.

$P1$ = Negative intermediate amplitude point.

$P2$ = Positive intermediate amplitude point.

In addition, the method employs several constants which do not change during the execution of the method. These constants, and typical values are as follows:

$CINC$ = Coarse adjustment increment. Typical value = 30.

$MINC$ = Medium adjustment increment. Typical value = 10.

$FINC$ = Fine adjustment increment. Typical value = 2.

$M$ = Scaling factor to determine intermediate amplitude. Typical value = 0.5.

$THRESH$ = Minimum difference required between $OMEAS$ and $NMEAS$.

Briefly, the method of the present invention writes a test pattern to a test track, determines the peak amplitude of the test pattern by incrementally moving the read element across the test pattern, locates the two actuator offsets that produce equal intermediate amplitudes, such as one-half of the maximum amplitude, and determines the midpoint between the two actuator offsets. The method uses the two intermediate points instead of the actuator offset of the maximum amplitude because curve 152 is relatively flat at the maximum amplitude, which may lead to unacceptable error in the measurement. In contrast, the slope of curve 152 is relatively steep at the 50% amplitude points.

Figure 11A:
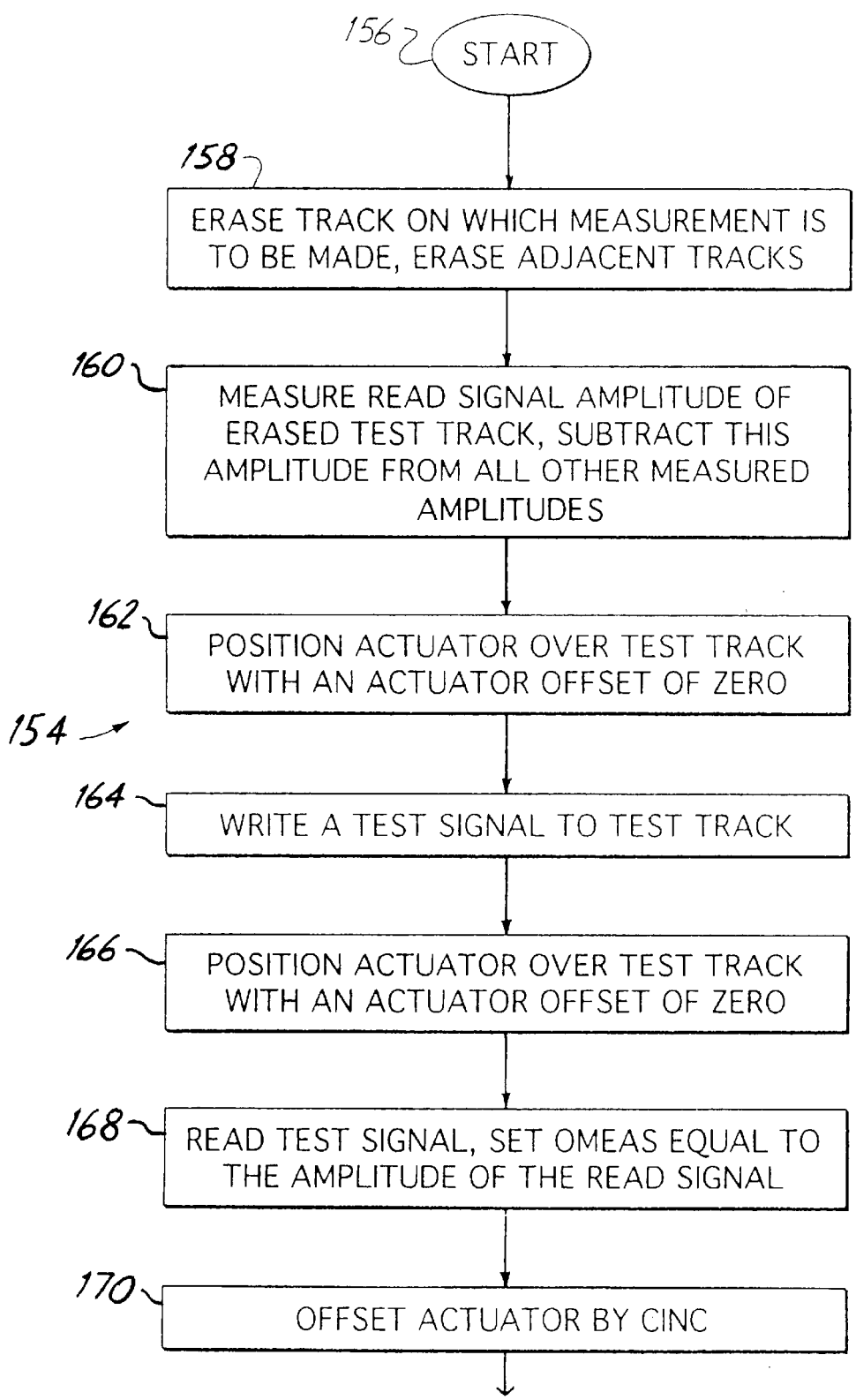
FIGS. 11A–11E are a flow chart illustrating the method of the present invention.
Figure 11B:
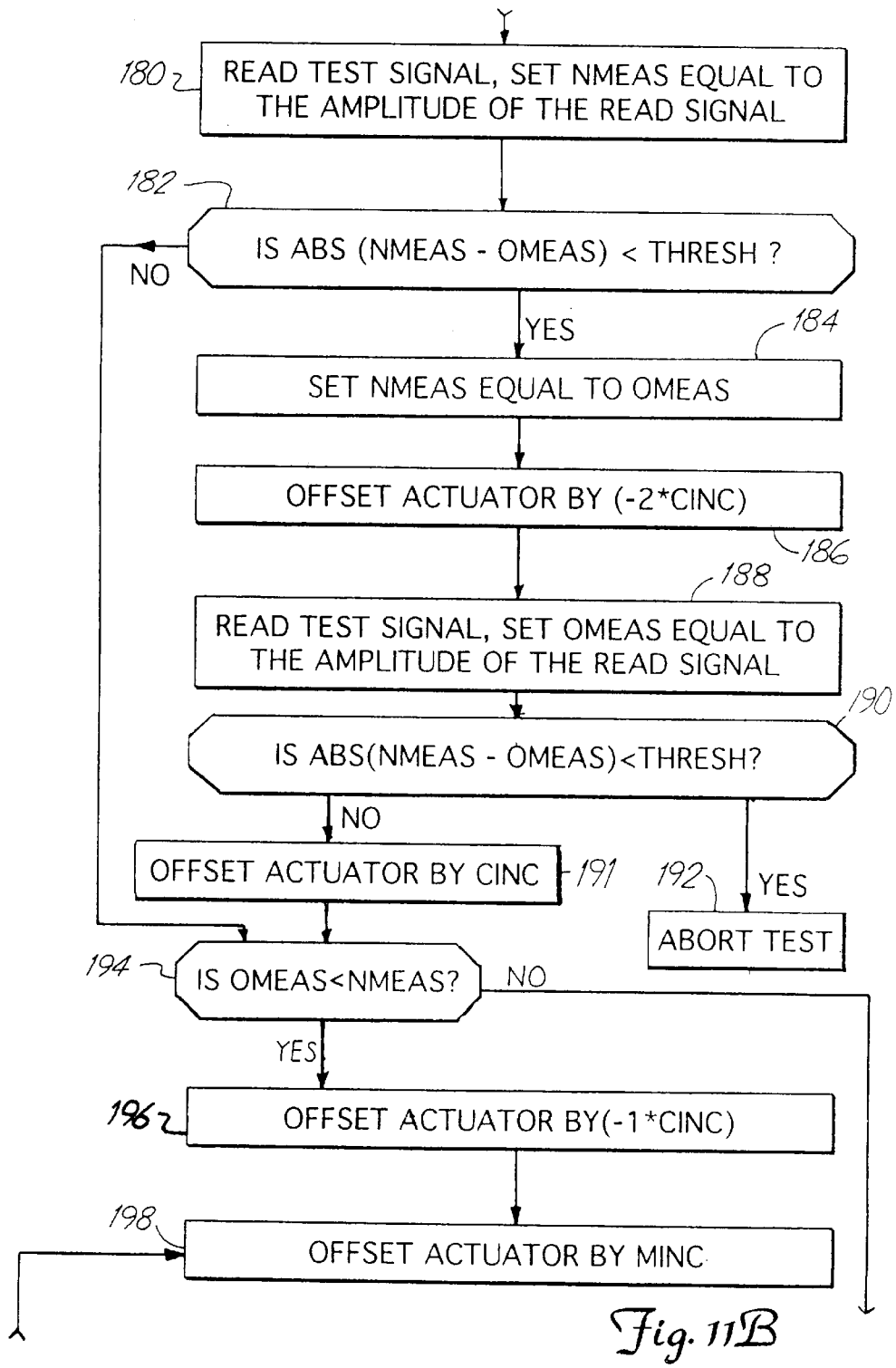
Figure 11C:
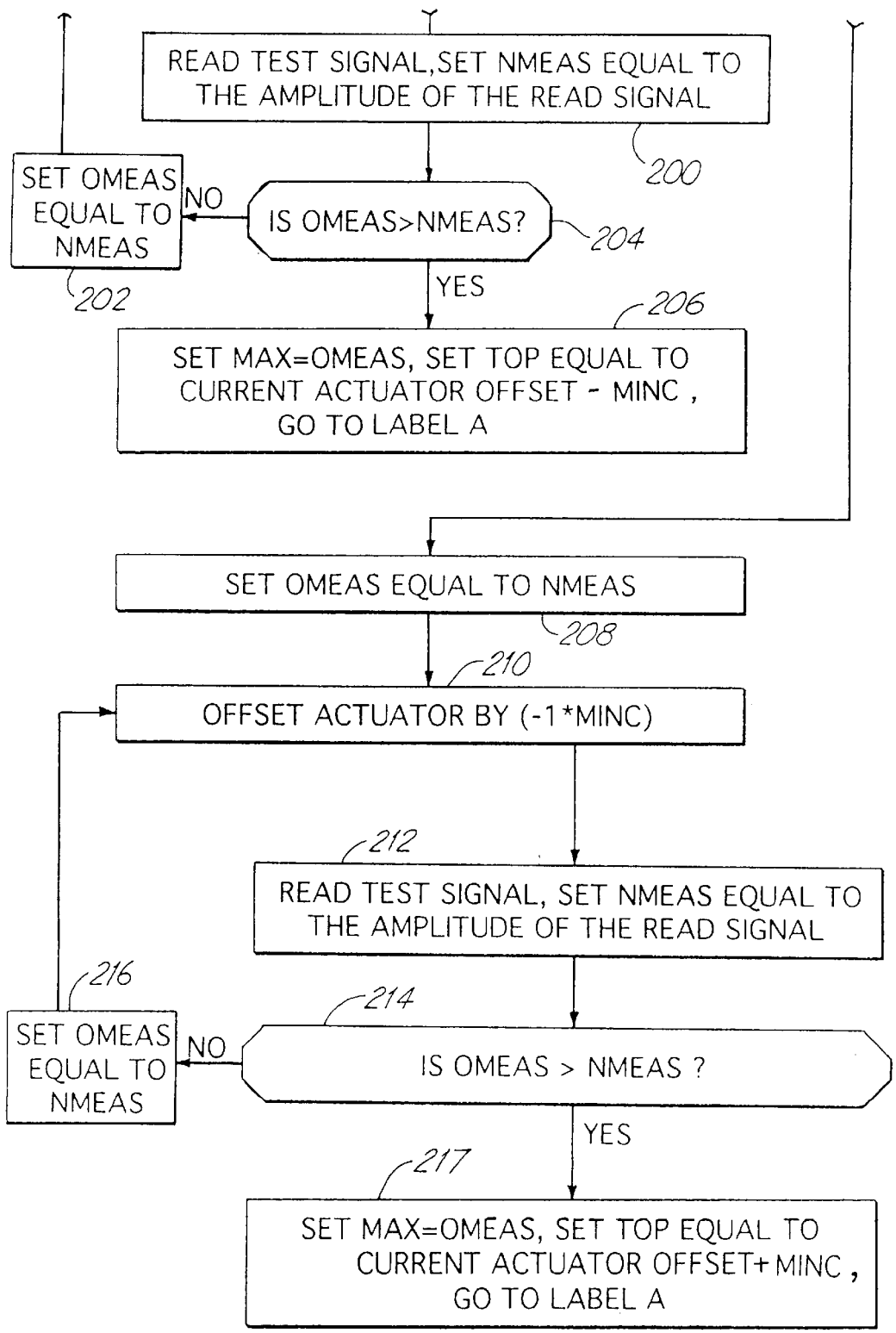
Figure 11D:
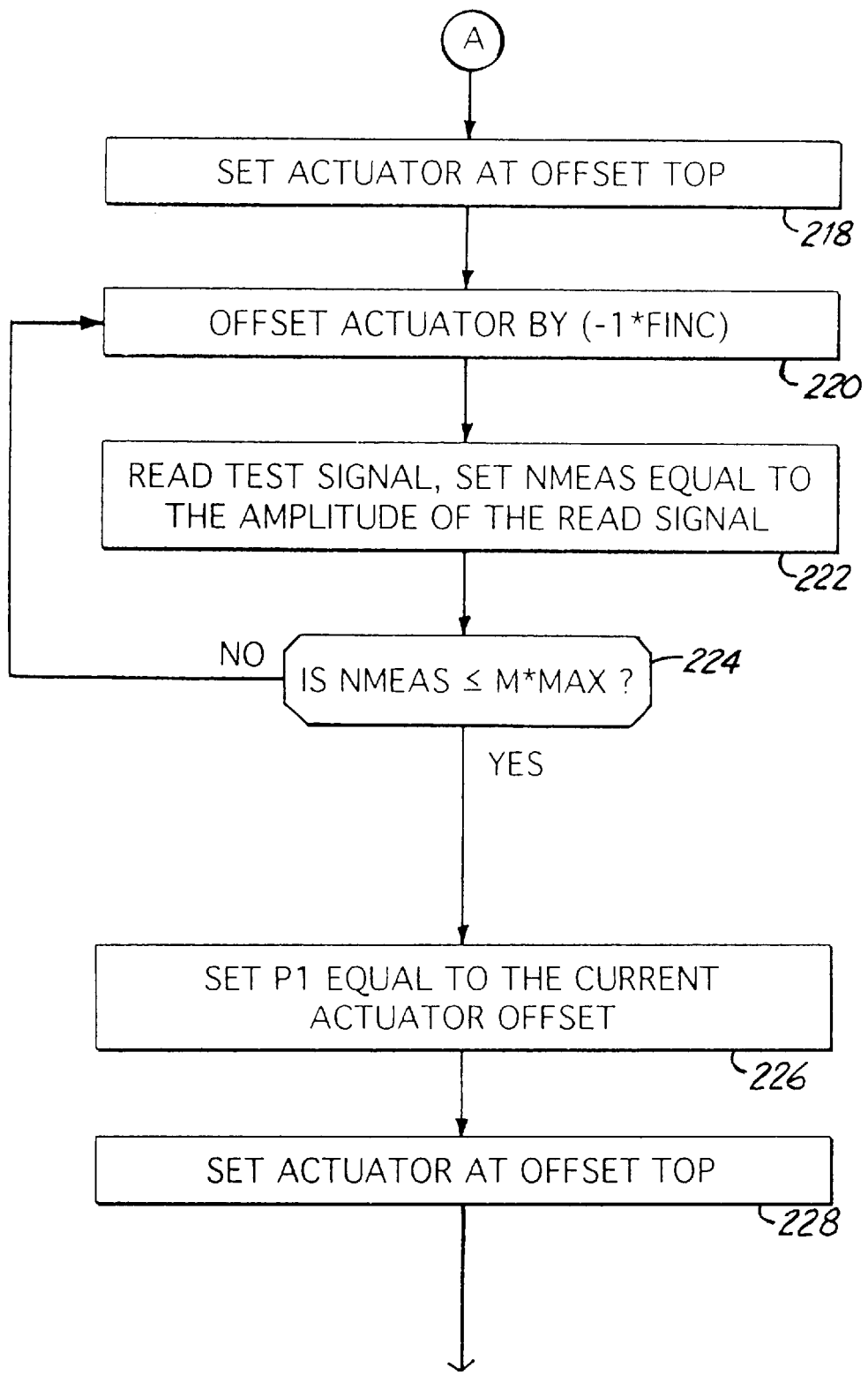
Figure 11E:
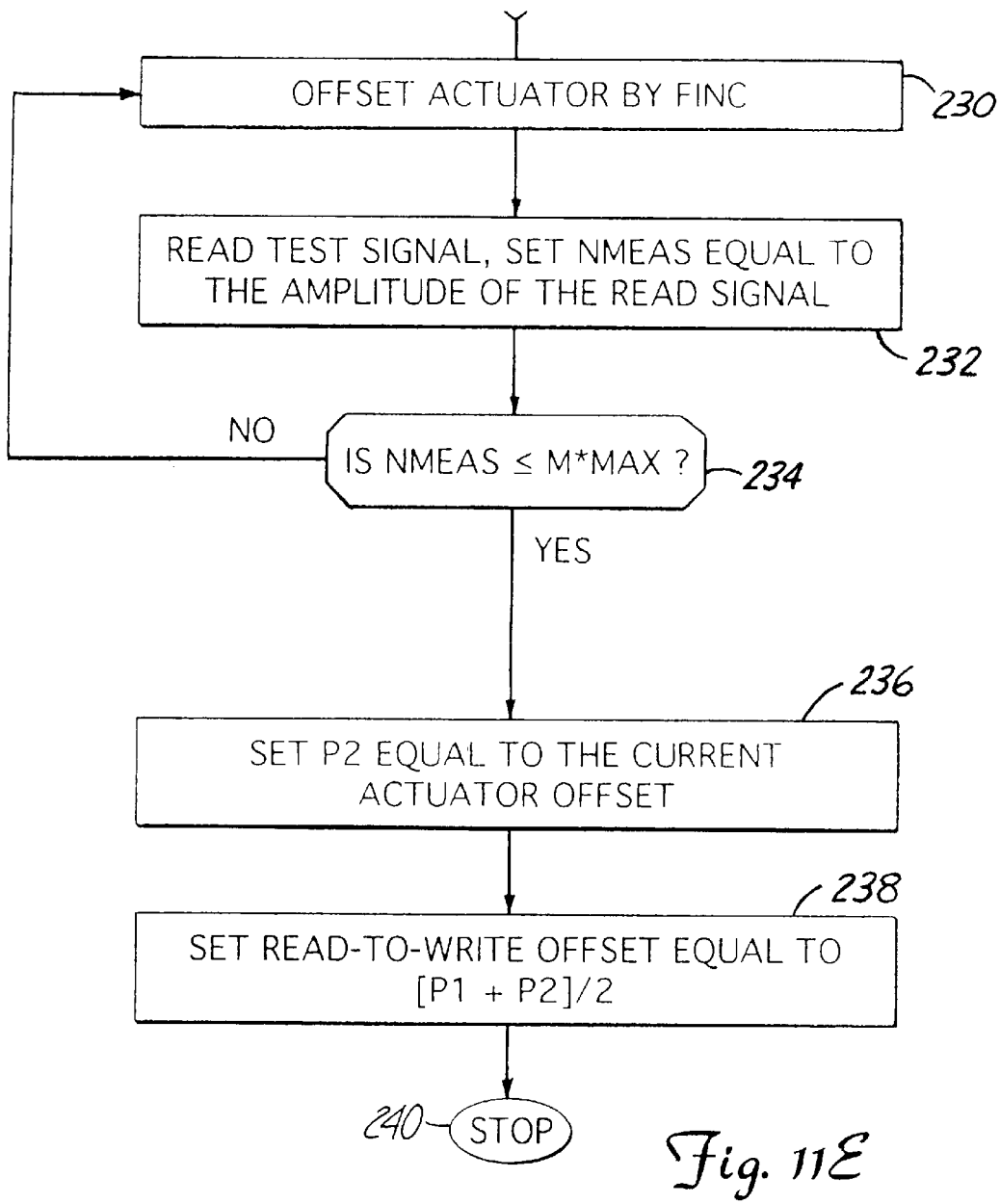

In FIG. 11A, the method of the present invention is initiated at step 156. At step 158, the test track is erased. For best results, adjacent tracks should also be erased. At step 160, the method measures the read signal amplitude of the erased track. This measurement provides a background noise level which is subtracted from all other amplitude measurements. For simplicity, the subtraction is shown only at step 160. However, it is intended that the measured background noise be subtracted from all other amplitudes. In other embodiments, step 160 is skipped and amplitude measurements are used in their raw form.

At step 162, the actuator is positioned adjacent the test track with an actuator offset of 0. At step 164, a test signal is written to the test track. As discussed above, in one type of thermal compensation scheme, a read element is incrementally moved across the width of a track to measure the amplitude across the track. In such disc drives, it is common to write a thermal compensation signal to the disc surface comprising a first burst offset from the track center and a second burst offset from the track center in an equal and opposite direction from the first burst. By using just one of the bursts, and writing this burst at an offset of 0, a signal similar to signal 150 shown in FIG. 9 will be written to the track. Of course, additional hardware can also be added to write such a signal.

At step 166, the actuator is repositioned adjacent the test track with an actuator offset of 0. At step 168, the test track is read using read element 54, and the variable OMEAS is set equal to the amplitude of the read signal. In FIG. 10, with the actuator geometry shown in FIG. 9, the variable OMEAS will be set to the amplitude shown at point 169 of FIG. 10. In step 170, the actuator is offset by a number of actuator offsets equal to the constant CINC. As noted above, a typical value for the constant CINC is 30. At step 180, read element 54 will read the test signal and set the variable NMEAS equal to the amplitude of the read signal. In FIG. 10, this corresponds approximately with point 172 on curve 152.

At decision step 182, the absolute value of the difference between NMEAS and OMEAS is compared with the constant THRESH. The constant THRESH represents the minimum difference required between the two variables OMEAS and NMEAS. The difference between OMEAS and NMEAS will be less than THRESH if, for example, the variable NMEAS was read at one side of the maximum of curve 152 and the variable OMEAS was read at the other side of the maximum. The difference may also be less than THRESH if the two variables were read at the extreme right or the extreme left of curve 152. In such cases, the "yes" branch is taken to step 184.

At step 184, the variable NMEAS is set to the variable OMEAS. At step 186, the actuator is offset by −2 multiplied by the constant CINC. Therefore, if step 170 had positioned the actuator slightly to the right of the maximum of curve 152, step 186 will position the actuator to the left of the maximum of curve 152 and to the left of an actuator offset of 0. At step 188, read element 54 will read the test signal and the variable OMEAS will be set to the amplitude of the read signal. Decision step 190 determines whether the difference between NMEAS and OMEAS is still less than the constant THRESH. Since step 186 positioned the actuator 30 offset increments on the other side of the 0 offset (using the typical constant values noted above), the actuator should now be positioned at a portion of curve 152 that has a relatively steeper slope. However, if the difference is still less than the variable THRESH, the "yes" branch will be taken to step 192, where the method is aborted. This could occur, for example, if a component is defective or if something in the disc drive is out of alignment.

If the difference is greater than or equal to the variable THRESH, the "no" branch is taken to step 191. At step 191, the actuator is offset by CINC, which positions the actuator at the offset where the value of NMEAS was last measured. After step 191, decision step 194 is executed. In addition, the "no" branch of decision step 182 leads to decision step 194. The "no" branch of decision step 182 will be taken whenever the difference between the old and new measurements is greater or equal to the constant THRESH.

At decision step 194, the variable OMEAS is compared to the variable NMEAS. If OMEAS is less than NMEAS, the "yes" branch will be taken to step 196. If, however, variable OMEAS is greater than NMEAS, the "no" branch will be taken to step 208. In FIG. 10, the variable OMEAS was originally set to the amplitude of point 169 and that the variable NMEAS was originally set to the amplitude of point 172. This difference is greater than the constant THRESH. In addition, the variable OMEAS is greater than the variable NMEAS. Accordingly, for the configuration shown in FIGS. 9 and 10, execution will branch to step 208.

At step 208, the variable OMEAS is set equal to the variable NMEAS. Therefore, the variable OMEAS is set to the amplitude of point 172. At step 210, the actuator is offset by the constant MINC multiplied by −1. As noted above, a typical value for MINC is 10. Accordingly, the actuator moves approximately one-third of the way from point 172 to point 169. At step 212, read element 54 will read the test signal and set the variable NMEAS equal to the amplitude of the read signal. At decision step 214, the variable OMEAS is compared to the variable NMEAS. Since OMEAS will be less than NMEAS, a "no" branch will be taken to step 216.

At step 216, the variable OMEAS is set to equal the variable NMEAS. Execution branches back to step 210 and the loop is repeated through steps 210, 212, 214, and 216. The loop will execute until the variable OMEAS is greater than the variable NMEAS. This will happen when the actuator reaches the maximum point of curve 152 and the variable NMEAS is set less than the variable OMEAS. When this happens, the "yes" branch will be taken to step 217 where the variable MAX is set to the variable OMEAS and the variable TOP is set equal to the current actuator offset plus MINC, which is the offset at which OMEAS was measured. At step 217, execution is then directed to label A.

FIG. 9 shows a transducer positioned adjacent an outer track. If the transducer had been illustrated with respect to an inner track, read element 54 would be positioned proximate to point 174 of curve 152 when the actuator is moved to an offset of 0. In this case, the variable OMEAS would be less than the variable NMEAS and execution would proceed from the "yes" branch of decision step 194.

The "yes" branch of decision step 194 ranches to step 196. At 196, the actuator is offset by −1 multiplied by CINC. This puts the actuator in the same position as it was when the variable OMEAS was first assigned in step 170. At step 198, the actuator is offset by the constant MINC. At step 200, read element 54 reads the test signal and the variable NMEAS is set equal to the amplitude of the read signal. Decision step 204 determines whether OMEAS is greater than NMEAS. If this is not true, execution is directed to step 202 where the variable OMEAS is set equal to the variable NMEAS. Execution then branches back to step 198. Execution will continue through the loop, with the actuator moving toward the maximum point of curve 152, until the variable OMEAS is greater than the variable NMEAS. At this point, execution will branch to step 206 where the variable MAX is set equal to the variable OMEAS, the variable TOP is set equal to the current actuator offset minus MINC, which is the offset at which OMEAS was measured, and execution is directed to label A. Accordingly, the loop represented by steps 198, 200, 204 and 202 is executed when the read element is offset to the left of track center and the loop comprised of steps 210, 212, 214 and 216 is executed when the read element is positioned to the right of the track center.

After the variables TOP and MAX have been determined, execution proceeds to label A. At step 218, the actuator is set to the offset TOP. At step 220, the actuator is offset by the variable FINC times −1. The variable FINC represents a fine actuator increment and as noted above, a typical value is 2. At step 222, read element 54 reads the test signal and sets the variable NMEAS equal to the amplitude of the read signal.

Decision step 224 determines whether the variable NMEAS is less than or equal to the maximum amplitude MAX multiplied be the scaling factor M. As noted above, a typical value for M is 0.5. If NMEAS is not less than of equal to M multiplied by MAX, execution branches back to step 220 and the loop is repeated. The "yes" branch of step 224 will be taken to step 226 when NMEAS is less than or equal to M * MAX. At step 226, the variable P1 is set to the current offset position.

At step 228, the actuator is moved back to the offset stored in variable TOP and at step 230 the actuator is moved by the an actuator offset equal to the constant FINC. At step 232, the test signal is read and the variable NMEAS is set equal to the amplitude of the read signal. At decision step 234, NMEAS is compared to M * MAX. If NMEAS is not less than or equal to M * MAX, execution branches back to step 230. The loop will continue executing steps 230, 232, and 234 until NMEAS is not less than or equal to M * MAX. At this point, execution branches to step 236 where the variable P2 is set equal to the current actuator offset.

At step 238, the read-to-write offset is set equal to the sum of P1 and P2 divided by two, and execution is terminated at step 238.

The method represented by flow chart 154 determines the read-to-write offset for a single transducer at a single track of a disc surface. Since the gap between read and write elements vary from transducer to transducer, this measurement must be performed for each transducer.

In addition, the read-to-write offset will vary based on actuator position. However, as noted above, the read-to-write offsets of all tracks accessed by a single transducer can be determined by applying the measured read-to-write offset of that transducer to a predetermined curve.

Besides the read-to-write offset, the actuator position must be continually adjusted to compensate for thermal expansion and contraction. Therefore, to perform a typical read operation, a processor in the disc drive must first calculate the read-to-write offset that will be required by the read operation, and then adjust this offset by the measured thermal compensation parameters.

The present invention provides a reliable method of measuring the read-to-write offset of a transducer having separate read and write elements. In one embodiment, the method uses existing thermal calibration circuitry to map the amplitude of a test signal across the width of a track. No additional hardware is required.

Although the present invention has been described with reference to preferred embodiments, workers skilled in the art will recognize that changes may be made in form and detail without departing from the spirit and scope of the invention.

What is claimed is:

1. In a disc drive system having a transducer with a read element that reads information from a track to produce a read signal and a write element that writes information to the track, a method of measuring a radial read-to-write offset between the read and write elements at a track on a disc surface of a disc in the disc drive system comprising:

writing a test signal to the track at a predetermined actuator offset;

incrementally moving the read element across a width of the track to measure a maximum amplitude in the read signal;

incrementally moving the read element across the width of the track to find first and second actuator offsets where the read signal has an amplitude approximately equal to a predetermined percentage of the maximum amplitude;

calculating a midpoint between the first and second actuator offsets; and setting the radial read-to-write offset equal to a difference between the midpoint and the predetermined actuator offset.

2. The method of claim 1 wherein the predetermined actuator offset is zero.

3. The method of claim 1 wherein the predetermined percentage is 50%.

4. The method of claim 1 and further comprising:
erasing the track.

5. The method of claim 4 and further comprising:
erasing tracks adjacent to the track.

6. In a disc drive system including a transducer with separate read and write elements, the read element for reading data from a track to produce a read signal, an actuator for incrementally moving the transducer across a width of the track, an actuator controller for operating the actuator, means for writing a test signal to the track, and means for measuring an amplitude of the test signal, the improvement comprising:

means for incrementally moving the read element across the width of the track to measure a maximum amplitude in the read signal;

means for incrementally moving the read element across the width of the track to find first and second actuator offsets where the read signal has an amplitude approximately equal to a predetermined percentage of the maximum amplitude;

means for calculating a midpoint between the first and second actuator offsets; and means for setting a radial read-to-write offset equal to a difference between the midpoint and the predetermined actuator offset.

7. The system of claim 6 and further comprising:
means for selecting the track; and
means for selecting the transducer.

8. The system of claim 7 and further comprising:
means for calculating the read-to-write offset for each track accessed by the transducer from the measured read-to-write offset of a track accessed by the transducer.

9. The system of claim 7 and further comprising:
means for measuring the read-to-write offset of at least one additional track; and
means for calculating the read-to-write offset for each track accessed by the transducer from the measured read-to-write offsets of measured tracks.

10. A system for measuring a radial read-to-write offset between read and write elements of a transducer confronting a track on a rotating storage disc of a disc drive system, the system comprising:

an actuator for moving the transducer in small increments across a width of the track;

an actuator controller coupled to the actuator, for directing the actuator to move in small increments across the width of the track;

means for receiving a read signal from the read element;

means for measuring an amplitude of the read signal;

means for instructing the actuator controller to incrementally move the read element across the width of the track to measure a maximum amplitude in the read signal;

means for instructing the actuator controller to incrementally move the read element across the width of the track to find first and second actuator offsets where the read signal has an amplitude approximately equal to a predetermined percentage of the maximum amplitude;

means for calculating a midpoint between the first and second actuator offsets; and means for setting the radial read-to-write offset equal to a difference between the midpoint and the predetermined actuator offset.

11. The system of claim 10 and further comprising:

means for erasing the track; and means for erasing tracks adjacent the track.

12. The method system of claim 10 and further comprising:

means for selecting the track; and means for selecting the transducer.

13. The system of claim 12 and further comprising:

means for calculating the read-to-write offset for every track accessed by the transducer from the measured read-to-write offset of a track.

14. The system of claim 12 and further comprising:

means for measuring the read-to-write offset of at least one additional track; and means for calculating the read-to-write offset for each track accessed by the transducer from the measured read-to-write offsets of measured tracks.

15. A method of finding a radial read-to-write offset of separate read and write elements of a transducer confronting a track on a disc comprising:

writing a test signal to the track at a first actuator offset with the write element;

measuring amplitudes of a read signal derived from the read element at a plurality of actuator offsets;

selecting from the plurality of offsets a maximum offset at which a maximum measured amplitude is measured;

selecting from the plurality of offsets an inner and outer offset having amplitudes approximately equal to a predetermined percentage of the maximum measured offset; and calculating the radial read-to-write offset from the first actuator offset, the measured amplitudes, and the plurality of actuator offsets.

* * * * *